United States Patent Office 2,734,901
Patented Feb. 14, 1956

2,734,901

PROCESS OF PREPARING INDOLIUM STYRYL DYES

Clarence F. Belcher, Bridgeton, N. J., assignor to E. I. du Pont de Nemours and Company, Wilmington, Del., a corporation of Delaware No Drawing. Application February 5, 1954,
Serial No. 408,589

9 Claims. (Cl. 260—240.9)

This invention relates to a new and improved process for the preparation of cationic dyes of the 2-(N-dialkylamino) styryl-1,3,3-trimethyl-3H-pseudoindolium type, and more particularly, to a simple one-step process in which the dyes are obtained in a relatively pure form having high water solubility.

It is well known in the dyeing industry that maximum brightness and strength of color are attributable to a great extent to the purity of a given dye. Sometimes purification is very troublesome and expensive, and in some cases, is responsible for the lack of extended use of a dye which otherwise has excellent properties. It is also highly desirable to obtain dyes in satisfactory yield and quality which may readily be dissolved in water for use in the trade. Many methods have been proposed for preparing dyes of the type to which the present invention relates but each method is accompanied by some serious disadvantage.

In U. S. 2,179,895, a method is disclosed in which related dyes are prepared by condensing the intermediates in a glacial acetic acid followed by drowning in water and salting out with sodium phosphate to isolate the crude dye. U. S. 2,242,474 discloses a method of reacting the intermediates in glacial acetic acid, alcoholic hydrochloric acid, and acetic anhydride.

It is an object of the present invention to prepare cationic dyes of the type mentioned above by a simple one-step process. Another object is to prepare such dyes and to isolate high yields of the dye inexpensively in a water-soluble form from a medium containing water. Other objects will be apparent as the description of the invention proceeds.

These and other objects are accomplished by a one-step process of preparing cationic dyes from 2-methylene-1,3,3-trimethylindoline and p-N-dialkylaminobenzaldehydes by condensing these intermediates in a water-soluble alcohol, ketone or ether, containing from about 5% to 40% by weight of water, in the presence of at least one molar proportion of phosphoric acid to one mol of 2-methylene-1,3,3-trimethylindoline and, thereafter, isolating the dye from the more soluble impurities by simple filtration.

The 2-methylene-1,3,3-trimethylindoline intermediate may be prepared by any known procedure such as that described by E. Fischer and A. Steche, Ann. 242, 351 (1887), Fischer's error in naming the compound as a quinoline derivative was corrected by K. Brunner, Ber. 31, 612 (1898).

The preferred benzaldehyde intermediates are p-N-dimethylaminobenzaldehyde and p-N-methyl-N-betacyanoethylaminobenzaldehyde.

The amount of water-soluble alcohol, ketone or ether is not critical, other than enough should be present to dissolve the starting materials. Any lower aliphatic monohydric alcohol, lower aliphatic ketone, such as acetone, methylethyl ketone, and dioxane is satisfactory provided it forms clear solutions with from 5% to 40% by weight of water. Isopropyl alcohol, ethyl alcohol, methyl alcohol and dioxane are preferred primarily because of their lower cost. The term lower is intended to cover members having 4 carbon atoms or less. The lower monomethyl or ethyl ether of ethylene glycol are also operative, but present some difficulties in the subsequent separation of the dye.

The amount of phosphoric acid should not be less than 1 mol per mol of the indoline intermediate but an excess is operable although unnecessary. The preferred ratio is from 1 mol to 1.1 mols of phosphoric acid per 1 mol of the indoline intermediate.

The reaction takes place readily at temperatures between about 70° C. and 100° C. depending somewhat on the aqueous vehicle used.

The following examples are given by way of illustration but it is so be understood that no limitation is placed thereon since the alcohols and ketones used in the examples may be substituted by any of these mentioned above.

*Example I*

A mixture of 20 g. isopropanol (99%), 5 g. water, 11.6 g. 85% $H_3PO_4$ (0.106 mol) and 7.45 g. dimethylaminobenzaldehyde (.05 mol) was stirred and warmed to 70° C. There was added 8.65 g. 2-methylene-1,3,3-trimethylindoline (.05 mol). The mixture was stirred at reflux for 4 hours. Crystals began separating from the warm mixture after about ½ hour. It was cooled to 2° C. and the crystals filtered off. The cake was washed with a cold (4° C.) mixture of 20 g. isopropanol and 11.6 g. 85% $H_3PO_4$ and 5 g. water, then with 20 g. isopropanol. After drying at 70° C., 24.3 g. of crystalline product was obtained. It colored polyacrylonitrile textile in a bright strong scarlet shade when applied from an aqueous solution. On heating to wool ironing temperature (150° C.–175° C.), the shade shifts only slightly from scarlet to red.

*Example II*

A mixture of 20 g. dioxane, 5 g. water, 9.4 g. (0.05 mol) N - cyanoethyl - N - methylaminobenzaldehyde, 6.35 g. (0.055 mol) 85% $H_3PO_4$ was stirred and heated to 80° C. over 1½ hours. A mixture of 8.65 g. (0.05 mol) 2-methylene-1,3,3-trimethylindoline with 10 g. dioxane was dropped into the mixture, which was held at 80° C.–82° C. for 2 hours longer. Then 10 cc. isopropanol was dropped in. On stirring several hours, the reaction mixture thickened to a pasty crystalline mass. Microscopic inspection showed yellow-brown crystals. The reaction mass was thinned by adding a mixture of 12 g. isopropanol, 36 g. dioxane and 6 g. water. The mixture was filtered at 25° C., and the crystalline cake washed with 32 g. of the dilution mixture. On drying at 65° C., 18.2 g. of crystalline product was obtained. It dyes polyacrylonitrile in a bright scarlet shade similar to that of Example I.

*Example III*

A mixture of 20 g. dioxane, 5 g. water, 9.4 g. N-cyanoethyl-N-methylaminobenzaldehyde and 8.65 g. 2-methylene-1,3,3-trimethylindoline was stirred and warmed to 80° C. There was added dropwise a mixture of 6.35 g. 85% $H_3PO_4$ and 10 g. dioxane. The temperature rose to 87° C. It was maintained at 85° C.–87° C. for 3 hours. After stirring and cooling to 30° C., 5 cc. of water was added to avoid tarriness. The mixture was stirred at room temperature until crystals separated. These were removed by filtration at room temperature and washed with 60 g. dioxane and 10 g. water. They were dried at 65° C.–70° C. to give 13.1 g. of crystalline product.

As in Examples I and II, polyacrylonitrile is dyed from an aqueous solution of the product.

Example IV

A mixture of 40 g. isopropanol (99%), 5 g. water, 6.35 g. 85% H₃PO₄ and 9.4 g. N-cyanoethyl-N-methylaminobenzaldehyde was stirred and warmed to 70° C. Then 8.65 g. of 2-methylene-1,3,3-trimethylindoline was added. The temperature rose to 77° C. The mixture was stirred at reflux (80–82° C.) for 4 hours. After several hours more crystals separated with the formation of a thick paste. To this was added a mixture of 40 g. isopropanol and 5 g. water to thin the reaction mass. The crystalline filter cake was washed with 80 g. isopropanol and 10 g. water (mixed). This gave 18.4 g. of product on drying. These crystals dye polyacrylonitrile to a bright scarlet shade.

Example V

A mixture of 55.2 g. isopropanol (99%), 6.7 g. water, 15 g. 2-methylene-1,3,3-trimethylindoline, and 16.7 g. N-cyanoethyl-N-methylaminobenzaldehyde was stirred and warmed to 80° C. Then 14.2 g. 75% H₃PO₄ was dropped in over approximately 1 hour while keeping the temperature at 80° C.–83° C. The crystals separated while refluxing. The reaction mass was stirred 1 hour longer at reflux and cooled to 20° C. The slurry was filtered and the cake washed with 45 g. of 82% isopropanol. The crystalline cake was dried at 60° C.–65° C., giving 34.3 g. crystalline dyestuff. As in the above examples, this product imparts a bright scarlet shade of excellent light-fastness to polyacrylonitrile fibers.

Example VI

Example V was repeated, using 25 g. 2-methylene-1,3,3-trimethylindoline, 27.2 g. N-beta-cyanoethyl-N-methylaminobenzaldehyde, 92.0 g. isopropanol (99%) and 53.8 g. water. The phosphoric acid (23.7 g. of 75% strength) was added over about 40 min. The additional heating and cooling steps were the same as in Example V. The crystalline product was isolated by filtration, washed with 60 g. of 60% isopropanol (in water) and dried at 60° C.–65° C. The yield was 33.5 g. of water-soluble crystals which dye polyacrylonitrile fibers to a bright scarlet shade.

Example VII

A mixture of 20 g. 2-methylene-1,3,3-trimethylindoline, 21.8 g. N-beta-cyanoethyl-N-methylaminobenzaldehyde, 73 g. monoethyl ether of ethylene glycol and 9 g. water was stirred and heated to 80° C. Then 18.9 g. 75% phosphoric acid was added over one hour. After one more hour at 80° C.–82° C., the mixture was stirred while cooling and filtered at 20° C. The crystalline cake was washed with 60 g. of 82% monoethyl ether of ethylene glycol (in water) and dried at 60° C.–65° C. This gave 39.0 g. of water-soluble crystals capable of dyeing polyacrylonitrile fibers to a bright scarlet shade.

The present invention offers many advantages over the prior art primarily in that the process is a cheap, convenient method for producing the subject dyes in high yield and purity. The dyes prepared according to the present invention are readily isolated from aqueous organic solutions which carry away practically all of the water-soluble contaminants, after which they may be used as isolated without further modification. These dyes are useful for dyeing synthetic fibers, such as those prepared from polyacrylonitrile and various copolymers with non-basic compounds. The dyes yield bright red textiles having exceptionally good light-fastness.

It is apparent that many widely different embodiments of this invention may be made without departing from the spirit and scope thereof, and therefore, it is not intended to be limited except as indicated in the appended claims.

I claim:

1. In the process of preparing cationic dyes of the 2-(N-dialkylamino)styryl-1,3,3 - trimethyl - 3H - pseudoindolium type by condensing 2-methylene-1,3,3-trimethylindoline and p-N-dialkylaminobenzaldehydes, the improvement which comprises condensing the reactants in an aqueous organic solvent selected from the class consisting of water-soluble lower aliphatic monohydric alcohols, lower aliphatic ketones and lower aliphatic ethers, said solvent containing from 5% to 40% by weight of water based on the weight of the said organic solvent, the said condensation being carried out in the presence of at least 1 molar proportion of phosphoric acid per mol of 2-methylene-1,3,3-trimethylindoline; and crystallizing the relatively pure dye from the said aqueous solvent.

2. The process of claim 1 in which the molar proportions of phosphoric acid is from 1 to 1.1 mols per mol of 2-methylene-1,3,3-trimethylindoline.

3. The process of claim 1 in which the organic solvent is isopropyl alcohol.

4. The process of claim 1 in which the organic solvent is ethyl alcohol.

5. The process of claim 1 in which the organic solvent is methyl alcohol.

6. The process of claim 1 in which the organic solvent is dioxane.

7. The process of claim 1 in which the condensation is carried out at a temperature of about 70° C. to 100° C.

8. The process of claim 1 in which the dye is recovered from the said solution by filtration.

9. A process as in claim 1, the p-N-dialkylaminobenzaldehyde being N-cyanoethyl-N-methylaminobenzaldehyde.

References Cited in the file of this patent

UNITED STATES PATENTS

| 2,104,855 | Dieterle et al. | Jan. 11, 1938 |
| 2,179,895 | Muller et al. | Nov. 14, 1939 |
| 2,242,474 | Kochendoerfer et al. | May 20, 1941 |
| 2,350,393 | Eislert et al. | June 6, 1944 |

OTHER REFERENCES

Jour. Chem. Soc., vol. 127, p. 2470 (1925).